(12) United States Patent
Nishikawa

(10) Patent No.: US 8,731,082 B2
(45) Date of Patent: May 20, 2014

(54) COMMUNICATION APPARATUS AND COMMUNICATION METHOD

(75) Inventor: Nobuyoshi Nishikawa, Osaka (JP)

(73) Assignee: Icom Incorporated (JP)

( * ) Notice: Subject to any disclaimer, the term of this patent is extended or adjusted under 35 U.S.C. 154(b) by 38 days.

(21) Appl. No.: 13/561,869

(22) Filed: Jul. 30, 2012

(65) Prior Publication Data

US 2013/0128996 A1 May 23, 2013

(30) Foreign Application Priority Data

Nov. 21, 2011 (JP) .................................. 2011-254227

(51) Int. Cl.
*H04K 1/10* (2006.01)

(52) U.S. Cl.
USPC ........... 375/260; 375/262; 375/267; 375/295; 375/316; 375/340

(58) Field of Classification Search
USPC ......... 375/260, 261, 262, 267, 272, 279, 295, 375/297, 299, 306, 316, 322, 324, 340, 344, 375/347, 350
See application file for complete search history.

(56) References Cited

U.S. PATENT DOCUMENTS

| | | | | |
|---|---|---|---|---|
| 7,046,740 B2 * | 5/2006 | Dowling | ...................... | 375/296 |
| 7,164,740 B2 * | 1/2007 | Olesen et al. | ................. | 375/347 |
| 7,907,690 B2 * | 3/2011 | Taylor et al. | ................... | 375/350 |
| 8,019,005 B2 * | 9/2011 | Hamamura | .................... | 375/259 |
| 8,270,432 B2 * | 9/2012 | Kim | .............................. | 370/465 |
| 8,290,089 B2 * | 10/2012 | Howard et al. | ............... | 375/316 |
| 8,437,413 B2 * | 5/2013 | Chun et al. | ..................... | 375/260 |
| 8,520,494 B2 * | 8/2013 | Yang et al. | ..................... | 370/204 |
| 2011/0098010 A1 * | 4/2011 | Mihota | ......................... | 455/101 |
| 2011/0235740 A1 * | 9/2011 | Harada et al. | ................. | 375/295 |
| 2012/0327757 A1 * | 12/2012 | Wang et al. | .................... | 370/208 |
| 2013/0107982 A1 * | 5/2013 | Nishikawa | ..................... | 375/295 |
| 2013/0136071 A1 * | 5/2013 | Han et al. | ...................... | 370/329 |
| 2013/0230120 A1 * | 9/2013 | Yang et al. | ..................... | 375/295 |

FOREIGN PATENT DOCUMENTS

JP 2006-165781 6/2006

* cited by examiner

*Primary Examiner* — Hirdepal Singh
(74) *Attorney, Agent, or Firm* — Baker & McKenzie LLP

(57) ABSTRACT

A modulator generates a modulation signal from an input signal. A serial-parallel converter generates a subcarrier modulation signal from the modulation signal. A first operator generates first data by multiplying a predetermined non-singular matrix by the subcarrier modulation signal. A second operator generates second data by multiplying a matrix calculated by multiplying a predetermined transformation matrix by the predetermined non-singular matrix by the subcarrier modulation signal, or multiplying the predetermined transformation matrix by the first data. A synthesizer generates a baseband signal from data obtained by adding the second data to the first data, or data obtained by subtracting the second data from the first data. A transmitter generates a transmission signal from the baseband signal, and transmits the transmission signal to another apparatus via an antenna.

4 Claims, 8 Drawing Sheets

FIG. 3

$$C_1 = \begin{bmatrix} 0 & 0 & 0 & 0 & 0 & -1 & 0 & 0 \\ 0 & 0 & 0 & 0 & 1 & 0 & 0 & 0 \\ 0 & 0 & 0 & 0 & 0 & 0 & 0 & 1 \\ 0 & 0 & 0 & 0 & 0 & 0 & -1 & 0 \\ 0 & -1 & 0 & 0 & 0 & 0 & 0 & 0 \\ 1 & 0 & 0 & 0 & 0 & 0 & 0 & 0 \\ 0 & 0 & 0 & 1 & 0 & 0 & 0 & 0 \\ 0 & 0 & -1 & 0 & 0 & 0 & 0 & 0 \end{bmatrix}$$

FIG. 5

$$\mathbf{C}_2 = \begin{bmatrix} 0 & 0 & 0 & 0 & -0.1 & -1 & -0.1 & -0.1 \\ 0 & 0 & 0 & 0 & 1 & 0.1 & 0.1 & 0.1 \\ 0 & 0 & 0 & 0 & 0.1 & 0.1 & 0.1 & 1 \\ 0 & 0 & 0 & 0 & -0.1 & -0.1 & -1 & -0.1 \\ -0.1 & -1 & -0.1 & -0.1 & 0 & 0 & 0 & 0 \\ 1 & 0.1 & 0.1 & 0.1 & 0 & 0 & 0 & 0 \\ 0.1 & 0.1 & 0.1 & 1 & 0 & 0 & 0 & 0 \\ -0.1 & -0.1 & -1 & -0.1 & 0 & 0 & 0 & 0 \end{bmatrix}$$

FIG. 6

| | RELATED ART | FIRST EMBODIMENT | SECOND EMBODIMENT |
|---|---|---|---|
| (1) MAXIMUM PAPR | 9.0 | 7.2 | 7.4 |
| (2) MINIMUM PAPR | 0.0 | 0 | 0.4 |
| (3) PAPR WIDTH ((1)-(2)) | 9.0 | 7.2 | 7.0 |

(UNIT: dB)

COMMUNICATION APPARATUS AND COMMUNICATION METHOD

CROSS REFERENCES TO RELATED APPLICATION

This application claims the benefit of Japanese Patent Application No. 2011-254227 filed on Nov. 21, 2011, the entire disclosure of which is incorporated by reference herein.

FIELD

This application relates to a communication apparatus and communication method.

BACKGROUND

In OFDM (Orthogonal Frequency-Division Multiplexing) communication, an input signal is modulated with subcarriers, and the modulated input signal is subjected to an IFFT (Inverse Fast Fourier Transformation) to generate a baseband signal. Depending on the input signal, therefore, a baseband signal with a high peak is generated, increasing the PAPR (Peak-to-Average Power Ratio). The increase in the PAPR needs an amplifier having a wide range of linearity to transfer a signal without distortion. To meet the requirement, techniques of reducing the PAPR are developed.

Unexamined Japanese Patent Application KOKAI Publication No. 2006-165781 discloses a technique for controlling the phase of a subcarrier modulation signal based on the optimal phase, calculated by a sequential decision procedure, prior to an IFFT in order to reduce the PAPR.

The OFDM communication needs to cope with reducing the PAPR. The technique disclosed in Unexamined Japanese Patent Application KOKAI Publication No. 2006-165781 needs to control the phase subcarrier by subcarrier by repeatedly calculating the optimal phase to reduce the PAPR.

SUMMARY

Accordingly, it is an object of the present invention to simplify the process of reducing the PAPR and further suppress additive noise in OFDM communication, thereby improving the bit error rate.

To achieve the object, according to one aspect of the invention, there is provided a communication apparatus for communicating with another apparatus in orthogonal frequency-division multiplexing wireless communication, the communication apparatus comprising:

a modulator that modulates an input signal by a predetermined modulation scheme, and assigns the modulated input signal to subcarriers with frequency components orthogonal to each other, thereby generating a subcarrier modulation signal;

a first operator that generates first data by multiplying a first matrix by the subcarrier modulation signal, the first matrix being a predetermined non-singular matrix for modulating the subcarrier modulation signal with the subcarriers;

a second operator that generates second data by multiplying a matrix calculated by multiplying the first matrix by a transformation matrix which is a predetermined non-singular matrix having a same size as the first matrix by the subcarrier modulation signal, or multiplying the transformation matrix by the first data, a product of a transposed conjugate matrix of the transformation matrix and the transformation matrix coinciding with or substantially coinciding with a unit matrix, a sum of the transposed conjugate matrix of the transformation matrix and the transformation matrix coinciding with or substantially coinciding with a zero matrix;

a synthesizer that generates a baseband signal from data obtained by adding the second data to the first data, or data obtained by subtracting the second data from the first data; and a transmitter that generates a transmission signal from the baseband signal, and transmits the transmission signal.

According to a second aspect of the invention, there is provided a communication apparatus for communicating with another apparatus in orthogonal frequency-division multiplexing wireless communication, the communication apparatus comprising:

a receiver that receives a transmission signal and generates a baseband signal;

a serial-parallel converter that performs serial-parallel conversion on the baseband signal to generate a parallel signal;

a third operator that generates third data by multiplying an inverse matrix of a first matrix, which is a predetermined non-singular matrix for modulating a subcarrier modulation signal with subcarriers, by the parallel signal;

a fourth operator that generates fourth data by multiplying an inverse matrix of a matrix calculated by multiplying the first matrix by a transformation matrix which is a predetermined non-singular matrix having a same size as the first matrix by the parallel signal, a product of a transposed conjugate matrix of the transformation matrix and the transformation matrix coinciding with or substantially coinciding with a unit matrix, a sum of the transposed conjugate matrix of the transformation matrix and the transformation matrix coinciding with or substantially coinciding with a zero matrix;

a decomposer that generates the subcarrier modulation signal by dividing data obtained by adding the fourth data to the third data by 2, or dividing data obtained by subtracting the fourth data from the third data by 2; and a demodulator that demodulates the subcarrier modulation signal by a predetermined demodulation scheme.

According to a third aspect of the invention, there is provided a communication method that is executed by a communication apparatus communicating with another apparatus in orthogonal frequency-division multiplexing wireless communication, the communication method comprising:

a modulation step of modulating an input signal by a predetermined modulation scheme, and assigns the modulated input signal to subcarriers with frequency components orthogonal to each other, thereby generating a subcarrier modulation signal;

a first operation step of generating first data by multiplying a first matrix by the subcarrier modulation signal, the first matrix being a predetermined non-singular matrix for modulating the subcarrier modulation signal with the subcarriers;

a second operation step of generating second data by multiplying a matrix calculated by multiplying the first matrix by a transformation matrix which is a predetermined non-singular matrix having a same size as the first matrix by the subcarrier modulation signal, or multiplying the transformation matrix by the first data, a product of a transposed conjugate matrix of the transformation matrix and the transformation matrix coinciding with or substantially coinciding with a unit matrix, a sum of the transposed conjugate matrix of the transformation matrix and the transformation matrix coinciding with or substantially coinciding with a zero matrix;

a synthesizing step of generating a baseband signal from data obtained by adding the second data to the first data, or data obtained by subtracting the second data from the first data; and a transmission step of generating a transmission signal from the baseband signal, and transmitting the transmission signal.

According to a fourth aspect of the invention, there is provided a communication method that is executed by a communication apparatus communicating with another apparatus in orthogonal frequency-division multiplexing wireless communication, the communication method comprising:

a reception step of receiving a transmission signal and generating a baseband signal;

a serial-parallel conversion step of performing serial-parallel conversion on the baseband signal to generate a parallel signal;

a third operation step of generating third data by multiplying an inverse matrix of a first matrix, which is a predetermined non-singular matrix for modulating a subcarrier modulation signal with subcarriers, by the parallel signal;

a fourth operation step of generating fourth data by multiplying an inverse matrix of a matrix calculated by multiplying the first matrix by a transformation matrix which is a predetermined non-singular matrix having a same size as the first matrix by the parallel signal, a product of a transposed conjugate matrix of the transformation matrix and the transformation matrix coinciding with or substantially coinciding with a unit matrix, a sum of the transposed conjugate matrix of the transformation matrix and the transformation matrix coinciding with or substantially coinciding with a zero matrix;

a decomposing step of generating the subcarrier modulation signal by dividing data obtained by adding the fourth data to the third data by 2, or dividing data obtained by subtracting the fourth data from the third data by 2; and a demodulation step of demodulating the subcarrier modulation signal by a predetermined demodulation scheme.

It is preferable that the product of the transposed conjugate matrix of the transformation matrix and the transformation matrix may coincide with a unit matrix, and the sum of the transposed conjugate matrix of the transformation matrix and the transformation matrix may coincide with a zero matrix.

The invention can simplify the process of reducing the PAPR and further suppress additive noise in OFDM communication, thereby improving the bit error rate.

BRIEF DESCRIPTION OF THE DRAWINGS

A more complete understanding of this application can be obtained when the following detailed description is considered in conjunction with the following drawings, in which:

FIG. 3 is a diagram illustrating an example of a transformation matrix according to the first embodiment;

FIG. 5 is a diagram illustrating an example of a transformation matrix according to a second embodiment of the invention;

FIG. 6 is a diagram illustrating simulated PAPR characteristics of baseband signals;

DETAILED DESCRIPTION

Figure 1:
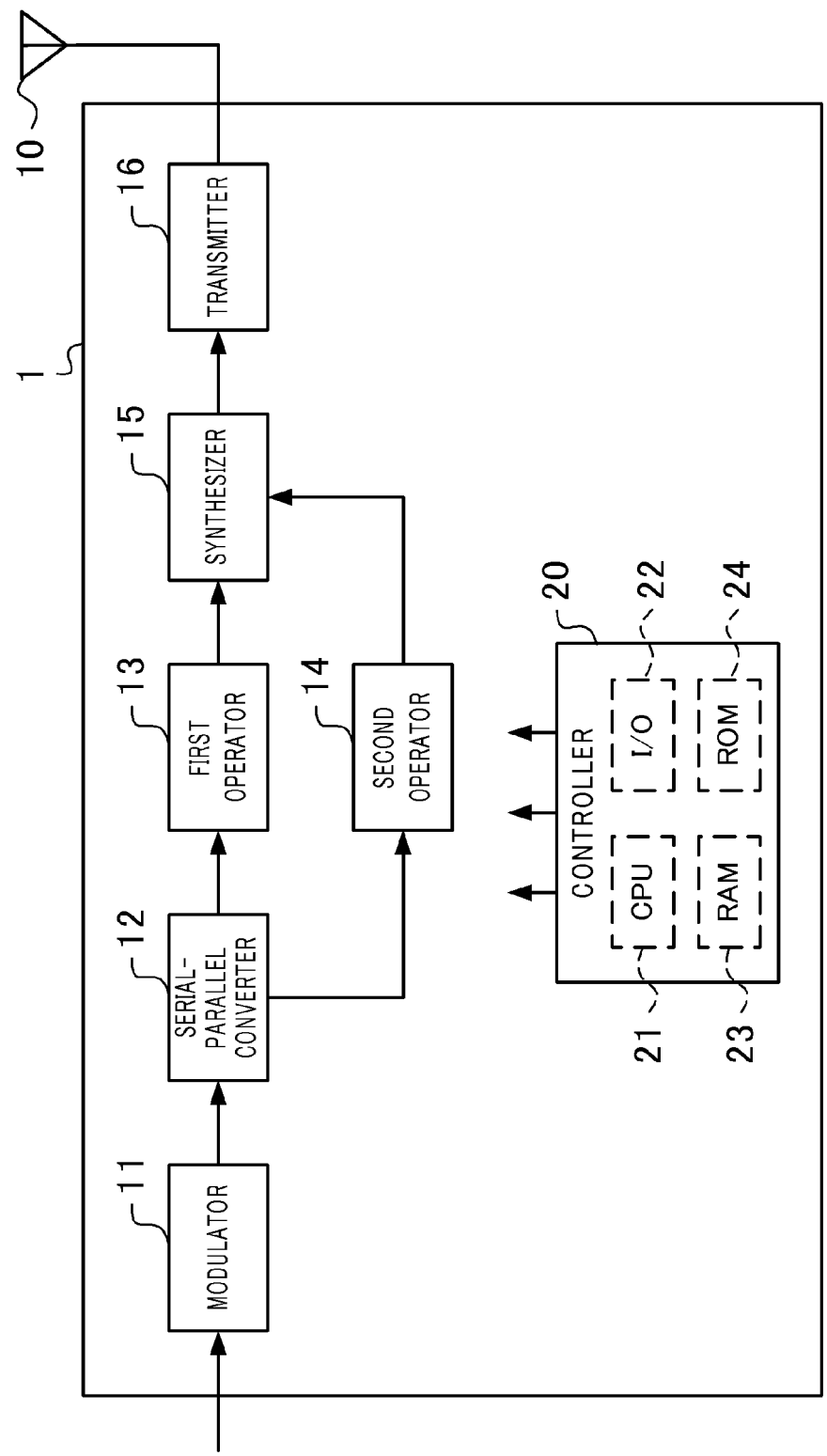
FIG. 1 is a block diagram illustrating a configuration example of a communication apparatus according to a first embodiment of the invention.

Exemplary embodiments of the invention will be described in detail hereinbelow with reference to the accompanying drawings. Same reference numerals are given to same or corresponding components throughout the diagrams.

First Embodiment

FIG. 1 is a block diagram illustrating a configuration example of a communication apparatus 1 according to a first embodiment of the invention. The communication apparatus 1 communicates with another apparatus using OFDM (Orthogonal Frequency-Division Multiplexing) wireless communication. The communication apparatus 1 includes an antenna 10, a modulator 11, a serial-parallel converter 12, a first operator 13, a second operator 14, a synthesizer 15, a transmitter 16, and a controller 20.

The controller 20 includes a CPU (Central Processing Unit) 21, RAM (Random Access Memory) 23, and ROM (Read-Only Memory) 24. Although signal lines from the controller 20 to the individual components are omitted to avoid complication and for the ease of understanding, the controller 20 is connected to the individual components of the communication apparatus 1 via an I/O (Input/Output) unit 22 to start and terminate the processes of the components and control the contents of the processes.

The RAM 23 stores data for generating a transmission frame, for example. The ROM 24 stores a control program for the controller 20 to control the operation of the communication apparatus 1. The controller 20 controls the communication apparatus 1 based on the control program.

Figure 2:
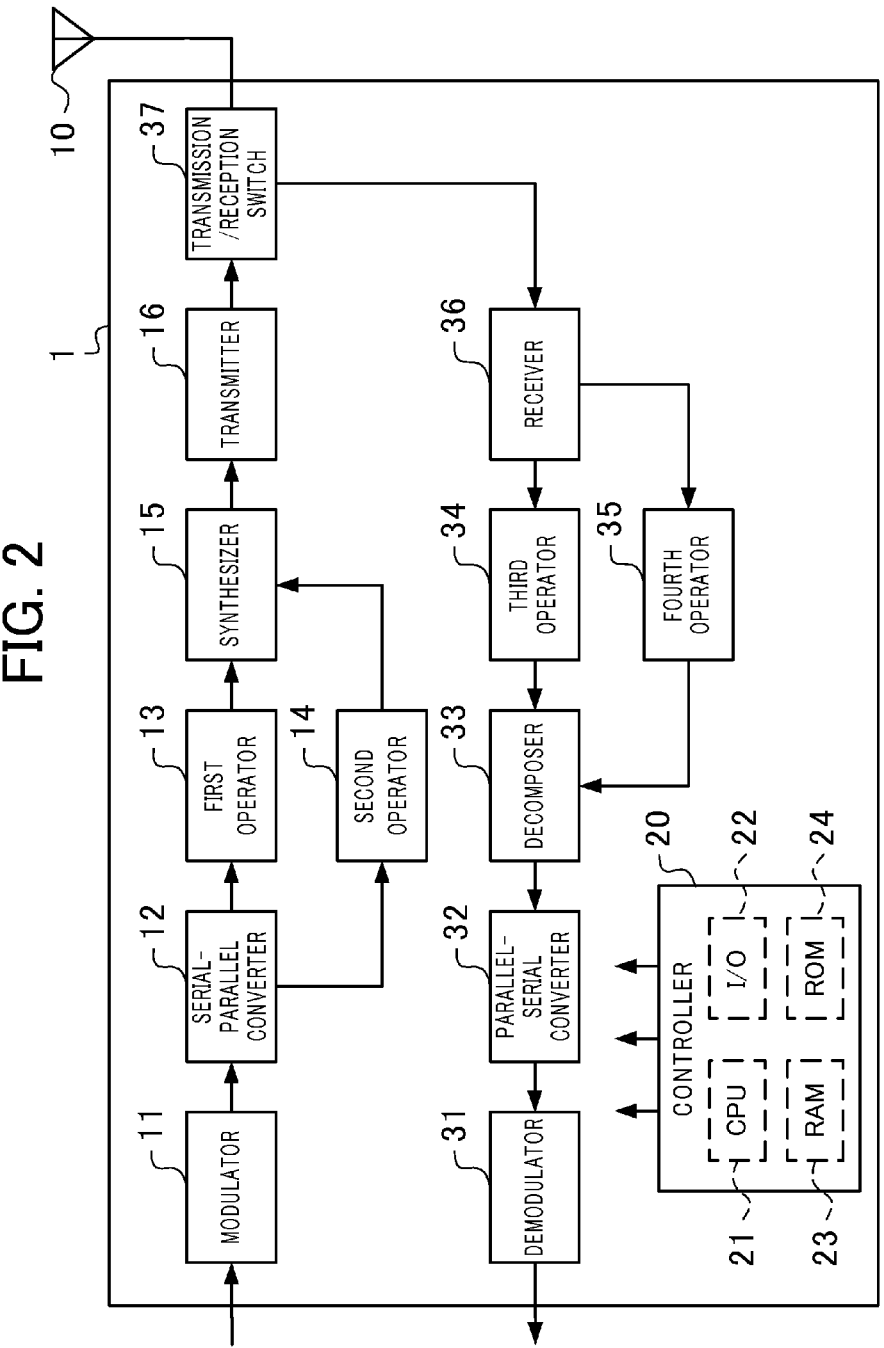
FIG. 2 is a block diagram illustrating a different configuration example of the communication apparatus according to the first embodiment.

FIG. 2 is a block diagram illustrating a different configuration example of the communication apparatus 1 according to the first embodiment. To provide the communication apparatus 1 with a reception function, the communication apparatus 1 shown in FIG. 2 further includes a demodulator 31, a parallel-serial converter 32, a decomposer 33, a third operator 34, a fourth operator 35, a receiver 36, and a transmission/reception switch 37. Referring to the communication apparatus 1 shown in FIG. 2 which has the transmission function and the reception function, a communication method which is carried out by the communication apparatus 1 will be described below.

The modulator 11 modulates an input signal by a predetermined modulation scheme to generate a modulation signal. The modulator 11 sends the generated modulation signal to the serial-parallel converter 12. The modulator 11 uses, for example, QPSK (Quadrature Phase-Shift Keying) as the modulation scheme. The serial-parallel converter 12 performs serial-parallel conversion on the modulation signal to generate a parallel signal, and assigns individual pieces of data of the generated parallel signal to subcarriers with frequency components orthogonal to each other to generate a subcarrier modulation signal. The serial-parallel converter 12 sends the generated subcarrier modulation signal to the first operator 13 and the second operator 14.

The first operator 13 generates first data by multiplying a first matrix, which is a predetermined non-singular matrix for modulating the subcarrier modulation signal with the subcarriers to which the individual pieces of data of the parallel signal are respectively assigned, by the subcarrier modulation signal, and sends the generated first data to the synthesizer 15. The first operator 13 uses, as the first matrix, a matrix indicating an IDFT (Inverse Discrete Fourier Transformation), for example. The first operator 13 may be configured to generate first data by performing an IFFT (Inverse Fast Fourier Transformation) on the subcarrier modulation signal. The first matrix is not limited to the matrix indicating an IDFT, and has only to be a non-singular matrix which enables modulation of the subcarrier modulation signal with subcarriers to which the individual pieces of data of the parallel signal are respectively assigned.

The second operator 14 uses a second matrix calculated by multiplying a transformation matrix which is a predetermined non-singular matrix of the same size as the first matrix by the first matrix. The following equation (1) expresses the relation among a first matrix $F_1^{-1}$, a transformation matrix $C_1$, and a second matrix $F_2^{-1}$.

[Eq. 1]

$$F_2^{-1} = C_1 F_1^{-1} \quad (1)$$

The second operator 14 generates second data by multiplying the second matrix $F_2^{-1}$ by the subcarrier modulation signal, and sends the generated second data to the synthesizer 15. The transformation matrix $C_1$ is a non-singular matrix such that a product of the transposed conjugate matrix of the transformation matrix $C_1$ and the transformation matrix coincides with a unit matrix, and a sum of the transposed conjugate matrix of the transformation matrix $C_1$ and the transformation matrix coincides with a zero matrix. That is, the transformation matrix $C_1$ is a unitary matrix, and a skew-Hermitian matrix. Because the transformation matrix $C_1$ is a unitary matrix, the following equation (2a) is satisfied. $C_1^*$ is the transposed conjugate matrix of $C_1$. Rewriting the equation (2a) derives the following equation (2b). $C_1^{-1}$ is the inverse matrix of $C_1$. Because the transformation matrix $C_1$ is a skew-Hermitian matrix, the following equation (2c) is satisfied. The following equation (2d) is derived from the equations (2b) and (2c).

[Eq. 2]

$$C_1^* C_1 = I \quad (2a)$$

$$C_1^* = C_1^{-1} \quad (2b)$$

$$C_1^* C_1 = 0 \quad (2c)$$

$$C_1 + C_1^{-1} = 0 \quad (2d)$$

FIG. 3 is a diagram illustrating an example of a transformation matrix according to the first embodiment. The second operator 14 uses, for example, the matrix shown in FIG. 3 as the transformation matrix $C_1$ when the first matrix has eight rows and eight columns.

The synthesizer 15 generates a baseband signal from either data obtained by adding the second data to the first data, or data obtained by subtracting the second data from the first data, and sends the generated baseband signal to the transmitter 16. Whether the synthesizer 15 performs addition or subtraction has been determined beforehand by a predetermined operation rule. Given that the subcarrier modulation signal is represented by d, an operation result u is expressed by the following equation (3). In the following description, double sign in same order is applied.

[Eq. 3]

$$u = F_1^{-1} d \pm F_2^{-1} d \quad (3)$$

The synthesizer 15 generates the baseband signal from the operation result u. As will be discussed later, demodulation is carried out according to the same operation rule on the reception side. The values of the individual elements of the first matrix $F_1^{-1}$, the second matrix $F_2^{-1}$, and the transformation matrix $C_1$ are determined in such a way that the individual elements of the subcarrier modulation signal d are included in the baseband signal.

The transmitter 16 generates a transmission signal from the baseband signal, and transmits the transmission signal to another apparatus via the transmission/reception switch 37 and the antenna 10.

The receiver 36 receives the transmission signal via the antenna 10 and the transmission/reception switch 37, and generates a baseband signal. The receiver 36 performs serial-parallel conversion on the generated baseband signal to generate a parallel signal u, and sends the generated parallel signal u to the third operator 34 and the fourth operator 35. The third operator 34 generates third data by multiplying an inverse matrix $F_1$ of the first matrix $F_1^{-1}$ used on the transmission side, which is a predetermined non-singular matrix for modulating the subcarrier modulation signal with the subcarriers, by the parallel signal u, and sends the generated third data to the decomposer 33. The third data is given by the following equation (4a). The following equation (4b) is derived from the equation (1).

[Eq. 4]

$$F_1 u = F_1 F_1^{-1} d \pm F_1 F_2^{-1} d \quad (4a)$$

$$= d \pm F_1 C_1 F_1^{-1} d \quad (4b)$$

The fourth operator 35 uses an inverse matrix $F_2$ of the second matrix $F_2^{-1}$ used on the transmission side and calculated by multiplying the transformation matrix $C_1$ which is a predetermined non-singular matrix of the same size as the first matrix $F_1^{-1}$ by the first matrix $F_1^{-1}$. The fourth operator 35 generates fourth data by multiplying the inverse matrix $F_2$ of the second matrix $F_2^{-1}$ by the parallel signal u, and sends the generated fourth data to the decomposer 33. The fourth data is given by the following equation (5a). Rewriting the equation (1), the relation among the inverse matrix $F_1$ of the first matrix, the inverse matrix $C_1^{-1}$ of the transformation matrix, and the inverse matrix $F_2$ of the second matrix is expressed by the following equation (6). The following equation (5b) is derived from the equation (6).

[Eq. 5]

$$F_2 u = F_2 F_1^{-1} d \pm F_2 F_2^{-1} d \quad (5a)$$

$$= F_1 C_1^{-1} F_1^{-1} d \pm d \quad (5b)$$

[Eq. 6]

$$F_2 = F_1 C_1^{-1} \quad (6)$$

The decomposer 33 adds the fourth data to the third data and divides the obtained data by "2", or subtracts the fourth data from the third data and divides the obtained data by "2" according to a predetermined operation rule. This operation rule is the same as the predetermined operation rule used by the synthesizer 15 on the transmission side. The decomposer 33 performs an operation of adding the fourth data to the third data when the synthesizer 15 has added the second data to the first data, or subtracting the fourth data from the third data when the synthesizer 15 has subtracted the second data from the first data, and then dividing the addition result or the subtraction result by "2". The result, r, of the operation is given by the following equation (7a). The following equation (7b) is derived from the equations (4b) and (5b). Rewriting the equation (7b) derives the following equation (7c). The following equation (7d) is derived from the equation (2d). Therefore, the operation result r from the decomposer 33 coincides with the subcarrier modulation signal d.

[Eq. 7]

$$r = \frac{F_1 u \pm F_2 u}{2} \quad (7a)$$

$$= d \pm \frac{1}{2}(F_1 C_1 F_1^{-1} d + F_1 C_1^{-1} F_1^{-1} d) \quad (7b)$$

$$= d \pm \frac{1}{2} F_1 (C_1 + C_1^{-1}) F_1^{-1} d \quad (7c)$$

$$= d \quad (7d)$$

The decomposer 33 sends the subcarrier modulation signal d to the parallel-serial converter 32. The parallel-serial converter 32 performs parallel-serial conversion on the subcarrier modulation signal d to generate a serial signal, and sends the serial signal to the demodulator 31. The demodulator 31 demodulates the serial signal by a predetermined demodulation scheme. For example, the demodulator 31 performs QPSK demodulation on the serial signal. Accordingly, the demodulator 31 can demodulate the input signal modulated by the modulator 11, and output the demodulated signal.

The communication apparatus 1 carries out communication in the following manner, for example, according to the principle described above. The first operator 13 uses a matrix indicating an IDFT and having two rows and two columns as given by the following equation (8), as the first matrix $F_1^{-1}$.

[Eq. 8]

$$F_1^{-1} = \frac{1}{\sqrt{2}} \begin{bmatrix} 1 & 1 \\ 1 & -1 \end{bmatrix} \quad (8)$$

The second operator 14 uses the transformation matrix $C_1$ given by the following equation (9a). The transposed conjugate matrix $C_1^*$ and inverse matrix $C_1^{-1}$ of the transformation matrix $C_1$ are given by the following equations (9b) and (9c), respectively. The second matrix $F_2^{-1}$ is given by the following equation (10).

[Eq. 9]

$$C_1 = \begin{bmatrix} 0 & 1 \\ -1 & 0 \end{bmatrix} \quad (9a)$$

$$C_1^* = \begin{bmatrix} 0 & -1 \\ 1 & 0 \end{bmatrix} \quad (9b)$$

$$C_1^{-1} = \begin{bmatrix} 0 & -1 \\ 1 & 0 \end{bmatrix} \quad (9c)$$

[Eq. 10]

$$F_2^{-1} = \frac{1}{\sqrt{2}} \begin{bmatrix} 1 & -1 \\ -1 & -1 \end{bmatrix} \quad (10)$$

The transformation matrix $C_1$ satisfies the equations (2a) to (2d). The following describes an example where the baseband signal is generated from the operation result u obtained by subtracting the second data from the first data by the synthesizer 15. The operation result u is given by the following equation (11). In this case, individual elements $d_0$, $d_1$ of the subcarrier modulation signal d are included in the operation result u. The synthesizer 15 generates the baseband signal from the operation result u, and sends the baseband signal to the transmitter 16.

[Eq. 11]

$$u = F_1^{-1} d - F_2^{-1} d \quad (11)$$

$$= \frac{1}{\sqrt{2}} \begin{bmatrix} 1 & 1 \\ 1 & -1 \end{bmatrix} \begin{bmatrix} d_0 \\ d_1 \end{bmatrix} - \frac{1}{\sqrt{2}} \begin{bmatrix} 1 & -1 \\ -1 & -1 \end{bmatrix} \begin{bmatrix} d_0 \\ d_1 \end{bmatrix}$$

$$= \frac{1}{\sqrt{2}} \begin{bmatrix} 2d_1 \\ 2d_0 \end{bmatrix}$$

The transmitter 16 generates a transmission signal from the baseband signal, and transmits the transmission signal to another apparatus. The receiver 36 receives the transmission signal, and generates a baseband signal. The receiver 36 performs serial-parallel conversion on the generated baseband signal to generate a parallel signal u, and sends the generated parallel signal u to the third operator 34 and the fourth operator 35. The inverse matrix $F_1$ of the first matrix $F_1^{-1}$ which is used by the third operator 34 is given by the following equation (12). The inverse matrix $F_2$ of the second matrix $F_2^{-1}$ which is used by the fourth operator 35 is given by the following equation (13).

[Eq. 12]

$$F_1 = \frac{1}{\sqrt{2}} \begin{bmatrix} 1 & 1 \\ 1 & -1 \end{bmatrix} \quad (12)$$

[Eq. 13]

$$F_2 = \frac{1}{\sqrt{2}} \begin{bmatrix} 1 & -1 \\ -1 & -1 \end{bmatrix} \quad (13)$$

The decomposer 33 subtracts the fourth data from the third data, and divides the obtained data by "2". The operation result r is given by the following equation (14). It is apparent that the operation result r coincides with the subcarrier modulation signal d.

[Eq. 14]

$$r = \frac{F_1 u - F_2 u}{2} \quad (14)$$

$$= \frac{1}{2}\left(\frac{1}{\sqrt{2}} \begin{bmatrix} 1 & 1 \\ 1 & -1 \end{bmatrix} \cdot \frac{1}{\sqrt{2}} \begin{bmatrix} 2d_1 \\ 2d_0 \end{bmatrix} - \frac{1}{\sqrt{2}} \begin{bmatrix} 1 & -1 \\ -1 & -1 \end{bmatrix} \cdot \frac{1}{\sqrt{2}} \begin{bmatrix} 2d_1 \\ 2d_0 \end{bmatrix}\right)$$

$$= \begin{bmatrix} d_0 \\ d_1 \end{bmatrix}$$

The decomposer 33 sends the subcarrier modulation signal d to the parallel-serial converter 32. The parallel-serial converter 32 performs parallel-serial conversion on the subcarrier modulation signal to generate a serial signal, and sends the serial signal to the demodulator 31. The demodulator 31 demodulates the serial signal by a predetermined demodulation scheme. For example, the demodulator 31 performs QPSK demodulation on the serial signal. Accordingly, the demodulator 31 can demodulate the input signal modulated by the modulator 11, and output the demodulated signal.

Figure 4:
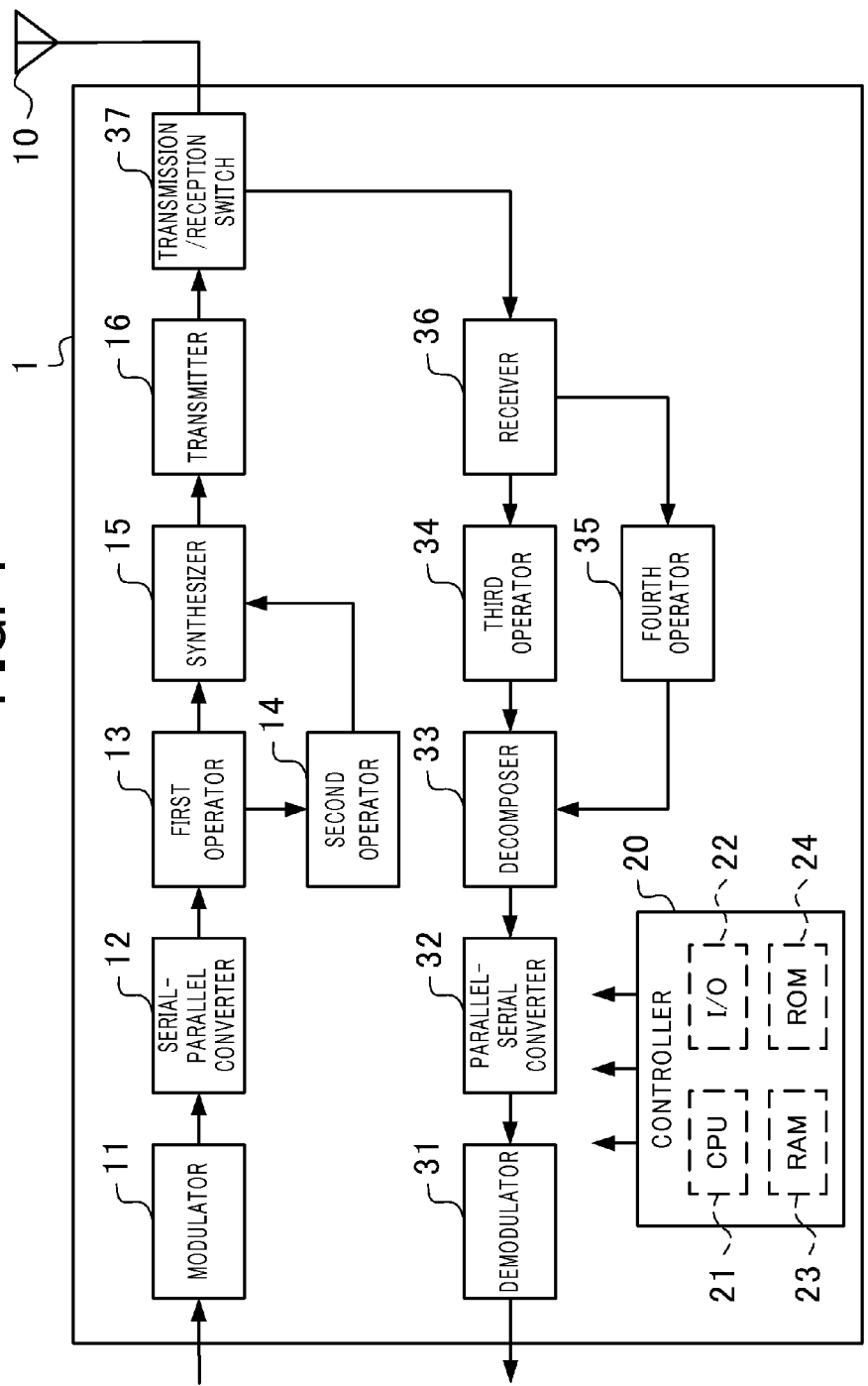
FIG. 4 is a block diagram illustrating another different configuration example of the communication apparatus according to the first embodiment.

FIG. 4 is a block diagram illustrating another different configuration example of the communication apparatus according to the first embodiment. Unlike the foregoing first embodiment, the first operator 13 sends first data to the second operator 14. The second operator 14 multiplies the transformation matrix by the first data to generate second data. Further, according to the embodiment, the communication apparatus on the reception side holds the inverse matrix $F_1$ of the first matrix $F_1^{-1}$ used by the communication apparatus on the transmission side, and the inverse matrix $F_2$ of the second matrix $F_2^{1}$ used by the communication apparatus on the transmission side. However, the communication apparatus on the reception side may be configured to hold the inverse matrix $F_1$ of the first matrix $F_1^{-1}$ and the inverse matrix $C_1^{-1}$ of the transformation matrix $C_1$. In this case, the fourth operator 35 multiplies the inverse matrix $F_1$ of the first matrix $F_1^{-1}$ by the inverse matrix $C_1^{-1}$ of the transformation matrix $C_1$, and further by the parallel signal u to generate fourth data.

As described above, the communication apparatus 1 according to the first embodiment of the invention can reduce the PAPR using a predetermined matrix. Because the process of controlling the phase for each subcarrier is unnecessary, it is possible to simplify the process of reducing the PAPR.

Second Embodiment

The configuration of a communication apparatus 1 according to a second embodiment of the invention is similar to that of the communication apparatus 1 according to the first embodiment. The communication apparatus 1 according to the second embodiment uses a predetermined non-singular matrix different from the one used in the first embodiment as a transformation matrix. The transformation matrix used in the second embodiment is a non-singular matrix such that the product of the transposed conjugate matrix of the transformation matrix and the transformation matrix substantially coincides with a unit matrix, and the sum of the transposed conjugate matrix of the transformation matrix and the transformation matrix substantially coincides with a zero matrix. The product of the transposed conjugate matrix of the transformation matrix and the transformation matrix substantially coinciding with a unit matrix means that the absolute value of each element in a matrix obtained by the difference between the matrix obtained by the product and a unit matrix is substantially smaller than 1. The sum of the transposed conjugate matrix of the transformation matrix and the transformation matrix substantially coinciding with a zero matrix means that the absolute value of each element in the matrix obtained by the sum is substantially smaller than 1.

A transformation matrix $C_2$ used in the second embodiment is neither a unitary matrix nor a skew-Hermitian matrix. As shown by the following equation (15a), however, the product of the transposed conjugate matrix $C_2^*$ of the transformation matrix $C_2$ and the transformation matrix $C_2$ substantially coincides with a unit matrix. Rewriting the equation (15a) derives the following equation (15b). Further, as shown by the following equation (15c), the sum of the transposed conjugate matrix $C_2^*$ of the transformation matrix $C_2$ and the transformation matrix $C_2$ substantially coincides with a zero matrix. The following equation (15d) is derived from the equations (15b) and (15c). Therefore, the equation (7d) is derived from the equation (7c), so that the input signal can be demodulated on the reception side.

Eq. [15]

$$C_2^* C_2 \approx I \quad (15a)$$

$$C_2^* \approx C_2^{-1} \quad (15b)$$

$$C_2^* + C_2 \approx 0 \quad (15c)$$

$$C_2 + C_2^{-1} \approx 0 \quad (15d)$$

In other words, if the equation (15d) is satisfied, the transformation matrix need not be a unitary matrix and a skew-Hermitian matrix.

FIG. 5 is a diagram illustrating an example of a transformation matrix according to the second embodiment of the invention. The communication apparatus 1 according to the second embodiment uses, for example, the matrix shown in FIG. 5 as the transformation matrix $C_2$. The values of different elements between the transformation matrix $C_2$ shown in FIG. 5 and the transformation matrix $C_1$ shown in FIG. 3 which is a unitary matrix and a skew-Hermitian matrix are 0.1 or −0.1. Therefore, the difference between the transformation matrix $C_2$ shown in FIG. 5 and the transformation matrix $C_1$ shown in FIG. 3 is very small. The matrix shown in FIG. 5 can therefore be regarded as substantially a unitary matrix, so that the equations (15a) and (15b) are satisfied. Further, the matrix shown in FIG. 5 can be regarded as substantially a skew-Hermitian matrix, so that the equation (15c) is satisfied. The equation (15d) is derived from the equations (15b) and (15c). The values of elements in a transformation matrix which differ from the values of elements in a matrix which is a unitary matrix as well as a skew-Hermitian matrix should not necessarily be 0.1 or −0.1 as shown in FIG. 5, and may take other values whose absolute values are sufficiently smaller than 1. Properly changing the values of elements in a transformation matrix can ensure control of the PAPR.

As described above, the communication apparatus 1 according to the second embodiment of the invention can reduce the PAPR using a predetermined matrix different from that used in the first embodiment. Because the process of controlling the phase for each subcarrier is unnecessary, it is possible to simplify the process of reducing the PAPR.

SPECIFIC EXAMPLES

Next, simulated advantages of the embodiments of the invention will be described. A simulation of generating a baseband signal was performed in the case of using a matrix indicating an IDFT as in the related art, in the case of the first embodiment, and in the case of the second embodiment. The matrix shown in FIG. 3 was used as a transformation matrix in the case of the first embodiment, and the matrix shown in FIG. 5 was used as a transformation matrix in the case of the second embodiment. The simulation was carried out with a random signal used as an input signal, QPSK used as the modulation scheme, and the first matrix, the transformation matrix and the second matrix having eight rows and eight columns. For the first embodiment and the second embodiment, the synthesizer 15 subtracted second data from first data.

FIG. 6 is a diagram illustrating simulated PAPR characteristics of baseband signals. For the case of the related art, the case of the first embodiment, and the case of the second embodiment, generation of a baseband signal was repeated, and the average value of the maximum values of the PAPR, the average value of the minimum values of the PAPR, and the PAPR width which is the difference between the maximum value of the PAPR and the minimum value of the PAPR were calculated. The units are all dB.

The maximum value of the PAPR was 9.0 dB, the minimum value of the PAPR was 0 dB, and the PAPR width was 9.0 dB when a matrix indicating an IDFT was used as in the related art. The maximum value of the PAPR was 7.2 dB, the minimum value of the PAPR was 0 dB, and the PAPR width was 7.2 dB in the case of the first embodiment. The maximum value of the PAPR was 7.4 dB, the minimum value of the PAPR was 0.4 dB, and the PAPR width was 7.0 dB in the case of the second embodiment.

The maximum value of the PAPR was reduced by 1.8 dB according to the first embodiment, and was reduced by 1.6 dB according to the second embodiment, as compared to that in the related art. Although the degree of reduction in the maximum value of the PAPR in the second embodiment was less than that in the first embodiment, the PAPR width became the smallest of 7.0 dB. The reduction in PAPR width is advantageous in that the range of linearity that is demanded of an amplifier becomes narrower. According to the second embodiment, the PAPR changes according to minute elements such as 0.1 or −0.1 in a transformation matrix. Therefore, the PAPR can be controlled by changing the values of elements in a transformation matrix. That is, the maximum value of the PAPR, the minimum value of the PAPR, and the PAPR width according to the second embodiment shown in FIG. 6 are variable.

Figure 7A:
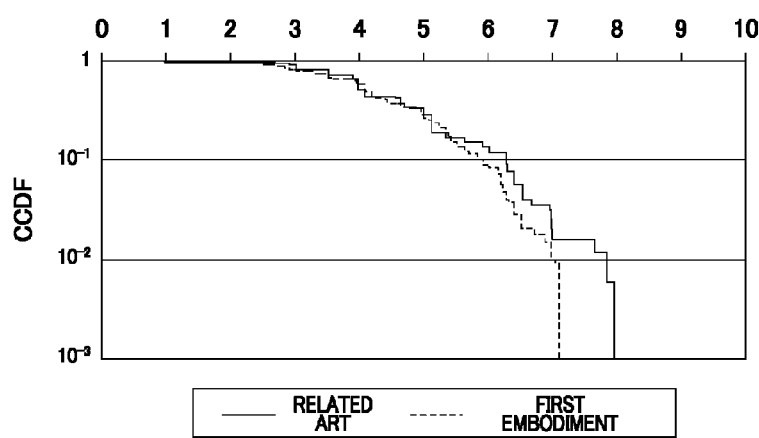
FIGS. 7A and 7B are diagrams illustrating simulated CCDF characteristics of the PAPRs of baseband signals.
Figure 7B:
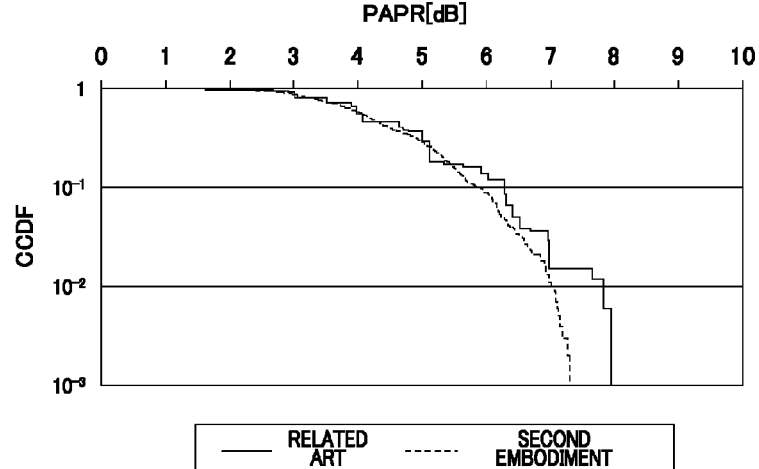

In addition, the CCDF (Complementary Cumulative Distribution Function) of the PAPR, i.e., the characteristic of the probability of occurrence of the PAPR, according to the related art was compared with the CCDF of the PAPR according to the first embodiment and the second embodiment. FIG. 7A is a diagram illustrating simulated CCDF characteristics of the PAPRs of baseband signals in the case of using a matrix indicating an IDFT as in the related art and in the case of the first embodiment. FIG. 7B is a diagram illustrating simulated CCDF characteristics of the PAPRs of baseband signals in the case of using a matrix indicating an IDFT as in the related art and in the case of the second embodiment. The abscissa represents the PAPR (unit: dB), and the ordinate represents the CCDF of the PAPR. In FIG. 7A, a solid-line graph represents the CCDF characteristic of the PAPR according to the related art and a dotted-line graph represents that in the case of the first embodiment. In FIG. 7B, a solid-line graph represents the CCDF characteristic of the PAPR according to the related art and a dotted-line graph represents that in the case of the second embodiment. Within the illustrated range, the PAPRs according to the first embodiment and the second embodiment of the invention were reduced as compared with the PAPR according to the related art.

Figure 8:
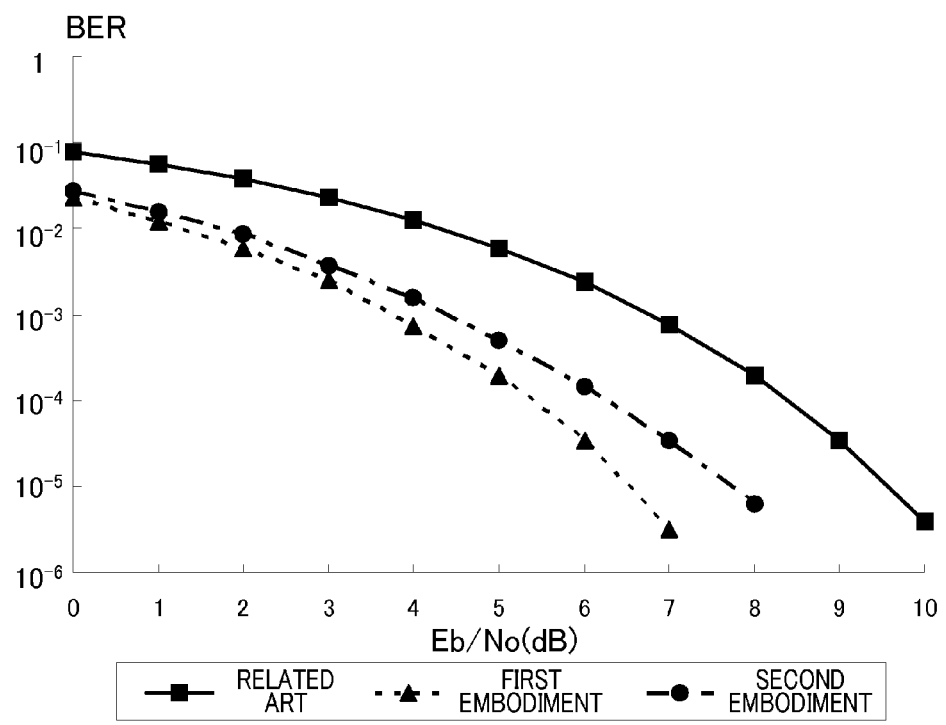
FIG. 8 is a diagram showing simulated BER characteristics.

Next, simulation for the BER (Bit Error Rate) was performed. FIG. 8 is a diagram showing simulated BER characteristics. The abscissa represents the Eb/No (Energy per Bit to NOise power spectral density ratio), and the ordinate represents the BER. The unit of Eb/No is dB. A solid-line graph showing the plot points by squares represents the BER in the case of using a matrix indicating an IDFT as in the related art. A dotted-line graph showing the plot points by triangles represents the BER according to the first embodiment. A dashed-line graph showing the plot points by round dots represents the BER according to the second embodiment. According to the first embodiment, noise became greater by about 3 dB but the BER was not deteriorated as compared to that in the related art. Because the sum of third data and fourth data, or the difference therebetween was calculated and divided by "2" in the decomposer 33, noise became smaller, and the BER was improved.

According to the second embodiment, the value of the BER can be controlled too by changing the values of elements, such as 0.1 or −0.1 in a transformation matrix.

Therefore, the communication apparatuses 1 according to the first embodiment and the second embodiment can reduce the PAPR as compared to the communication apparatus according to the related art, and further can suppress additive noise, thereby improving the BER. Because the process of repeating the calculation and controlling the phase for each subcarrier to reduce the PAPR is unnecessary, it is possible to simplify the process of reducing the PAPR. Further, according to the second embodiment, changing the values of elements in a transformation matrix can ensure control of the PAPR width and the BER.

The modes of the invention are not limited to the foregoing embodiments. The modulation scheme of the modulator 11 is not limited to QPSK, but PSK (Phase Shift Keying), QAM (Quadrature Amplitude Modulation) or the like may be used instead of QPSK. The layout order of the modulator 11 and the serial-parallel converter 12 may be changed so that the serial-parallel converter 12 performs serial-parallel conversion on an input signal and assigns individual pieces of data in the parallel signal to subcarrier signals, and then the modulator 11 modulates the individual pieces of data in the parallel signal by a predetermined modulation scheme. In this case, the demodulation process is carried out on the reception side with the layout order of the demodulator 31 and the parallel-serial converter 32 being changed.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A communication apparatus for communicating with another apparatus in orthogonal frequency-division multiplexing wireless communication, the communication apparatus comprising:

a modulator that modulates an input signal by a predetermined modulation scheme, and assigns the modulated input signal to subcarriers with frequency components orthogonal to each other, thereby generating a subcarrier modulation signal;

a first operator that generates first data by multiplying a first matrix by the subcarrier modulation signal, the first matrix being a predetermined non-singular matrix for modulating the subcarrier modulation signal with the subcarriers;

a second operator that generates second data by multiplying a matrix calculated by multiplying the first matrix by a transformation matrix which is a predetermined non-singular matrix having a same size as the first matrix by the subcarrier modulation signal, or multiplying the transformation matrix by the first data, a product of a transposed conjugate matrix of the transformation matrix and the transformation matrix coinciding with or substantially coinciding with a unit matrix, a sum of the transposed conjugate matrix of the transformation matrix and the transformation matrix coinciding with or substantially coinciding with a zero matrix;

a synthesizer that generates a baseband signal from data obtained by adding the second data to the first data, or data obtained by subtracting the second data from the first data; and a transmitter that generates a transmission signal from the baseband signal, and transmits the transmission signal.

2. A communication apparatus for communicating with another apparatus in orthogonal frequency-division multiplexing wireless communication, the communication apparatus comprising:

a receiver that receives a transmission signal and generates a baseband signal;

a serial-parallel converter that performs serial-parallel conversion on the baseband signal to generate a parallel signal;

a third operator that generates third data by multiplying an inverse matrix of a first matrix, which is a predetermined non-singular matrix for modulating a subcarrier modulation signal with subcarriers, by the parallel signal;

a fourth operator that generates fourth data by multiplying an inverse matrix of a matrix calculated by multiplying the first matrix by a transformation matrix which is a predetermined non-singular matrix having a same size as the first matrix by the parallel signal, a product of a transposed conjugate matrix of the transformation matrix and the transformation matrix coinciding with or substantially coinciding with a unit matrix, a sum of the transposed conjugate matrix of the transformation matrix and the transformation matrix coinciding with or substantially coinciding with a zero matrix;

a decomposer that generates the subcarrier modulation signal by dividing data obtained by adding the fourth data to the third data by 2, or dividing data obtained by subtracting the fourth data from the third data by 2; and a demodulator that demodulates the subcarrier modulation signal by a predetermined demodulation scheme.

3. A communication method that is executed by a communication apparatus communicating with another apparatus in orthogonal frequency-division multiplexing wireless communication, the communication method comprising:

a modulation step of modulating an input signal by a predetermined modulation scheme, and assigns the modulated input signal to subcarriers with frequency components orthogonal to each other, thereby generating a subcarrier modulation signal;

a first operation step of generating first data by multiplying a first matrix by the subcarrier modulation signal, the first matrix being a predetermined non-singular matrix for modulating the subcarrier modulation signal with the subcarriers;

a second operation step of generating second data by multiplying a matrix calculated by multiplying the first matrix by a transformation matrix which is a predetermined non-singular matrix having a same size as the first matrix by the subcarrier modulation signal, or multiplying the transformation matrix by the first data, a product of a transposed conjugate matrix of the transformation matrix and the transformation matrix coinciding with or substantially coinciding with a unit matrix, a sum of the transposed conjugate matrix of the transformation matrix and the transformation matrix coinciding with or substantially coinciding with a zero matrix;

a synthesizing step of generating a baseband signal from data obtained by adding the second data to the first data, or data obtained by subtracting the second data from the first data; and a transmission step of generating a transmission signal from the baseband signal, and transmitting the transmission signal.

4. A communication method that is executed by a communication apparatus communicating with another apparatus in orthogonal frequency-division multiplexing wireless communication, the communication method comprising:

a reception step of receiving a transmission signal and generating a baseband signal;

a serial-parallel conversion step of performing serial-parallel conversion on the baseband signal to generate a parallel signal;

a third operation step of generating third data by multiplying an inverse matrix of a first matrix, which is a predetermined non-singular matrix for modulating a subcarrier modulation signal with subcarriers, by the parallel signal;

a fourth operation step of generating fourth data by multiplying an inverse matrix of a matrix calculated by multiplying the first matrix by a transformation matrix which is a predetermined non-singular matrix having a same size as the first matrix by the parallel signal, a product of a transposed conjugate matrix of the transformation matrix and the transformation matrix coinciding with or substantially coinciding with a unit matrix, a sum of the transposed conjugate matrix of the transformation matrix and the transformation matrix coinciding with or substantially coinciding with a zero matrix;

a decomposing step of generating the subcarrier modulation signal by dividing data obtained by adding the fourth data to the third data by 2, or dividing data obtained by subtracting the fourth data from the third data by 2; and a demodulation step of demodulating the subcarrier modulation signal by a predetermined demodulation scheme.

* * * * *